(12) United States Patent
Bao

(10) Patent No.: US 9,795,864 B1
(45) Date of Patent: Oct. 24, 2017

(54) DETACHABLE MODULAR ELECTRIC SKATEBOARD AND REMOTE CONTROL DEVICE THEREOF

(71) Applicant: Shenzhen Jiyu Technology Co., Ltd., Shenzhen, CA (US)

(72) Inventor: Jian Bao, Shenzhen (CN)

(*) Notice: Subject to any disclaimer, the term of this patent is extended or adjusted under 35 U.S.C. 154(b) by 0 days.

(21) Appl. No.: 15/244,576

(22) Filed: Aug. 23, 2016

(30) Foreign Application Priority Data

Jun. 30, 2016 (CN) .......................... 2016 1 0513228

(51) Int. Cl.
  *A63C 17/12* (2006.01)
  *A63C 17/01* (2006.01)
  *B60L 15/00* (2006.01)
  *B60L 15/02* (2006.01)

(52) U.S. Cl.
  CPC ............ *A63C 17/017* (2013.01); *A63C 17/12* (2013.01); *B60L 15/00* (2013.01); *B60L 15/025* (2013.01); *B60L 2200/24* (2013.01)

(58) Field of Classification Search
  CPC ....................................................... A63C 17/12
  USPC ......................................................... 180/181
  See application file for complete search history.

(56) References Cited

U.S. PATENT DOCUMENTS

| | | | | |
|---|---|---|---|---|
| 4,143,728 A * | 3/1979 | Shiber | ................ | A63C 17/0073 180/181 |
| 4,508,187 A * | 4/1985 | Wenzel | .................. | A63C 17/12 180/181 |
| 4,915,403 A * | 4/1990 | Wild | ...................... | A63C 17/12 280/11.115 |
| 5,020,621 A * | 6/1991 | Martin | ................... | A63C 17/01 180/180 |
| 5,224,719 A * | 7/1993 | Goodspeed | ............ | A63C 17/01 280/11.115 |
| 5,330,026 A * | 7/1994 | Hsu | ........................ | A63C 17/01 180/181 |
| 5,487,441 A * | 1/1996 | Endo | ..................... | A63C 17/004 180/181 |
| 5,893,425 A * | 4/1999 | Finkle | .................... | A63C 17/01 180/180 |
| 5,927,420 A * | 7/1999 | Karrington | .......... | A63C 17/004 180/181 |

(Continued)

*Primary Examiner* — Jeffrey J Restifo
(74) *Attorney, Agent, or Firm* — Novoclaims Patent Services LLC; Mei Lin Wong

(57) ABSTRACT

A detachable modular electric skateboard which comprises a board body, wheel frames arranged at the bottom of the board body and provided with wheels driven by external force to travel together with the board body and the wheel frames, a traveling suspension part detachably installed at the end of the board body, and a power supply control part arranged at the bottom of the board body and provided with a detachably-installed battery assembly, and further discloses a remote control device for controlling the electric skateboard. Through the detachable traveling suspension part and the power supply control part, the advantages of existing electric skateboards and ordinary skateboards are integrated, a user can achieve the function switching according to requirements, and the detachable modular electric skateboard can replace daily vehicles driven by manpower and perfectly shows the recreational significance of ordinary skateboards serving as sports equipment.

15 Claims, 9 Drawing Sheets

(56) References Cited

U.S. PATENT DOCUMENTS

| | | | |
|---|---|---|---|
| 6,796,394 B1* | 9/2004 | Lin | A63C 17/12 180/180 |
| 7,040,638 B2* | 5/2006 | Cole | A63C 17/12 180/181 |
| 7,293,622 B1* | 11/2007 | Spital | A63C 17/12 180/180 |
| 7,635,136 B2* | 12/2009 | Cole | A63C 17/12 180/165 |
| 8,061,725 B1* | 11/2011 | Hawkins | A63C 17/12 180/181 |
| 2009/0149112 A1* | 6/2009 | Clark, Jr. | A63H 30/04 446/437 |
| 2010/0222941 A1* | 9/2010 | Chang | A63C 17/015 701/2 |
| 2013/0081891 A1* | 4/2013 | Ulmen | A63C 17/12 180/181 |
| 2013/0206493 A1* | 8/2013 | Larson | A63C 17/012 180/181 |
| 2014/0027192 A1* | 1/2014 | King | A63C 17/12 180/181 |
| 2014/0262574 A1* | 9/2014 | Rodgers | A63C 17/12 180/167 |
| 2016/0059108 A1* | 3/2016 | Demolder | A63C 17/12 701/22 |
| 2016/0067588 A1* | 3/2016 | Tan | A63C 17/12 180/181 |

* cited by examiner

DETACHABLE MODULAR ELECTRIC SKATEBOARD AND REMOTE CONTROL DEVICE THEREOF

BACKGROUND OF THE INVENTION

Technical Field

The invention belongs to the technical field of sports equipment, relates to traveling tools, provides an electric skateboard, and particularly relates to an assembly type detachable modular electric skateboard.

Description of Related Art

Skateboards, serving as devices that are recreational and used as traveling tools, are highly popular with people (especially young people). A traditional skateboard is composed of a board body, wheel frames, bearings, wheels and other components, and people push the skateboard to slide forwards by treading on the middle of the front end of the board body with one foot, treading on the ground backwards for propelling with the other foot and moving the center of the body weight forwards. Obviously, when the traditional skateboard is in use, in order to keep the speed, people need to tread on the ground with feet continuously for providing power, and certain requirements for the flatness of the ground need to be met. As a toy, the traditional skateboard is quite simplex in power and can only be slid by means of manpower, and since the manpower is limited, the traditional skateboard cannot continue to be played once people are tired.

For solving the above-mentioned problems, an electric skateboard with electric energy as power emerges at the right moment.

At present, the shortage of urban road resources in the world is increasingly serious, urban congestion is severe, and people spend a large quantity of time traveling. Personal electric vehicles, such as electric balance bikes, are environmentally friendly, portable and capable of facilitating urban commuting, have already been popularized in the world and bring certain convenience to people for traveling. However, due to the fact that the accessories such as batteries and motors are arranged in electric skateboards, the electric skateboards are large in size and high in weight, and the most important intrinsic recreational function of the skateboards cannot be achieved. Certain existing electric skateboard products such as American BOOSTED BOARD and skateboard based on the Chinese stool technique exist on the market, all the traditional electric skateboards are sold as a whole without exception, the accessories such as the batteries and the motors are arranged in the traditional electric skateboards, meanwhile the traditional electric skateboards cannot be disassembled, and consequentially the skateboards are large in size and high in weight. Although the traditional skateboards can also serve as vehicles, the most important intrinsic recreational attribute of the skateboards has already been lost, and thus the development of the traditional electric skateboards is severely limited. In conclusion, the traditional electric skateboards mainly have the following technical defects that:

(1) The existing electric skateboards on the market are all sold as a whole, are large in size and high in weight and can only serve as vehicles in the functional aspect, and the most important recreational significance of the skateboards is greatly reduced. According to traditional ordinary skateboards, the gravity center is low, and thus traveling stability is facilitated; the size is small, and thus the appearance is attractive and fashionable; the weight is about 2-3 KG, and thus the traditional ordinary skateboards are light, portable and capable of making various skateboard motions. However, according to traditional electric skateboards, the gravity center is too high, and consequentially the traveling safety is affected; the size is large and the weight is high, and consequentially the recreational attribute of the traditional skateboards is lost; the weight is about 7.9 KG and consequentially the traditional electric skateboards are not portable.

(2) The endurance mileage of the existing electric skateboards is limited and is generally about 20 kilometers; in addition, the batteries of the existing electric skateboards cannot be replaced, the charging time is long, and consequentially the using convenience of users is restrained.

(3) The existing electric skateboards are driven by square-wave motors, shaking can occur during starting, starting is not linear, the experience feeling cannot be fully achieved, and the safety of new users is affected.

BRIEF SUMMARY OF THE INVENTION

For solving the above-mentioned problems, the invention provides a detachable modular electric skateboard based on existing skateboards and electric skateboards. The detachable modular electric skateboard can serve as a long-distance commuting tool, and the intrinsic recreational significance of the skateboard is not affected.

According to the technical scheme adopted by the invention for achieving the above-mentioned purposes:

The detachable modular electric skateboard comprises a board body and wheel frames arranged at the bottom of the board body, wheels are installed on the wheel frames, and the wheels are driven by external force to travel together with the board body and the wheel frames; the detachable modular electric skateboard is different from existing electric skateboards in that the detachable modular electric skateboard at least further comprises a traveling suspension part and a power supply control part, the traveling suspension part is detachably installed at the end of the board body, the power supply control part is arranged at the bottom of the board body, and the power supply control part is provided with a detachably-installed battery assembly. The detachable design is the most outstanding core design making the electric skateboard different from the existing electric skateboards or the ordinary skateboards.

According to one specific implementation way, the traveling suspension part of the detachable modular electric skateboard at least comprises a wheel frame, wheels, a bridge base, a suspension swing arm, and a suspension fast-disassembly support; the wheels are arranged at the two ends of the wheel frame, hub motors are integrated in the wheels, the bridge base is arranged on the wheel frame, the two ends of the suspension swing arm are connected with the base portion of the bridge base and one end of the suspension fast-disassembly support correspondingly, and the suspension fast-disassembly support is detachably installed at the end of the board body.

For making a power wheel set (the wheels) of the detachable traveling suspension part adaptable to various road surfaces and obstacles and keeping the road holding force and the comfort, a damping plate spring is additionally arranged on the traveling suspension part. One end of the damping plate spring is arranged at the top of the bridge base, the other end of the damping plate spring is connected with one end of the suspension fast-disassembly support, and the damping plate spring and the suspension swing arm are connected with the same end of the suspension fast-disassembly support.

According to a preferred implementation way, the damping plate spring is located above the suspension swing arm, and a triangular assembly is formed by the damping plate spring, the bridge base and the suspension swing arm. The triangle stability principle is reasonably used by the triangular assembly, so that the overall structural design stability and firmness of the traveling suspension part are improved, and accordingly the safety performance of the electric skateboard is improved.

Furthermore, a bridge base connecting piece matched with the suspension fast-disassembly support is arranged at the end of the board body, and the bridge base connecting piece is detachably connected with the suspension fast-disassembly support. The bridge base connecting piece is fixed to the end of the board body, and the traveling suspension part can be detachably mounted on or dismounted from the board body by means of the bridge base connecting piece.

For mounting the traveling suspension part on the board body and dismounting the traveling suspension part from the board body, various detachable connection ways can be adopted. According to a preferred implementation way, the suspension fast-disassembly support is slidably connected with the bridge base connecting piece in an inserted mode, matched first guide rail mechanisms are arranged on the two sides of the suspension fast-disassembly support and the two sides of the bridge base connecting piece, and the suspension fast-disassembly support and the bridge base connecting piece are slidably connected into a whole through the first guide rail mechanisms on the sides of the suspension fast-disassembly support and the sides of the bridge base connecting piece.

According to a preferred implementation way of the structure of the suspension fast-disassembly support, the suspension fast-disassembly support at least comprises a suspension fast-disassembly support body and first guide rail parts that are located on the two sides of the suspension fast-disassembly support body and arranged oppositely, and the opposite inner surfaces of the inner sides of the first guide rail parts protrude to form first guide rails; the bridge base connecting piece at least comprises a bridge base connecting piece body and first sliding rail parts which are located on the two sides of the bridge base connecting piece body and arranged oppositely, and the opposite outer surfaces of the outer sides of the first sliding rail parts are sunken inwards to form first concave grooves for containing the first guide rails; the first guide rail parts of the suspension fast-disassembly support and the first sliding rail parts of the bridge base connecting piece form the first guide rail mechanisms.

Preferably, the suspension fast-disassembly support is provided with an anti-disengagement buckle used for preventing accidental disengagement of the first guide rail mechanisms, the anti-disengagement buckle is arranged on the suspension fast-disassembly support body between the first guide rail parts, and the anti-disengagement buckle is connected to the bridge base connecting piece body between the first sliding rail parts. Through the design of the anti-disengagement buckle, the suspension fast-disassembly support is effectively prevented from disengaging from the bridge base connecting piece, and the firmness and reliability of the combination of the traveling suspension part and the board body are further improved. What needs to be indicated is that the implementation way for additionally arranging the anti-disengagement buckle on the suspension fast-disassembly support is only one of multiple implementation ways for achieving disengagement prevention, and those ordinarily skilled in the art can adopt the same way or other similar ways having the same purpose for achieving disengagement prevention according to the design idea of the invention.

A detailed description of the design of the power supply control part is also provided by the invention. The power supply control part at least comprises the battery assembly and a control support assembly, the control support assembly is arranged at the bottom of the board body, and the battery assembly is detachably installed on the control support assembly.

According to a preferred implementation way, the battery assembly is slidably connected with the control support assembly in an inserted mode, matched second guide rail mechanisms are formed by the battery assembly and the control support assembly, and the battery assembly and the control support assembly are slidably connected into a whole through the second guide rail mechanisms.

According to the optimized design of the structure of the control support assembly, the control support assembly is of a segmental connection structure and at least comprises a battery sliding rail support, an electronic speed regulator box, an electronic speed regulator cover plate, a battery fast-disassembly frame support and a battery fast-disassembly frame, and the battery sliding rail support, the electronic speed regulator box, the electronic speed regulator cover plate, the battery fast-disassembly frame support and the battery fast-disassembly frame are assembled into a whole; the matched second guide rail mechanisms are formed by the battery sliding rail support and the battery assembly, and the battery sliding rail support and the battery assembly are slidably connected into a whole through the second guide rail mechanisms; the battery fast-disassembly frame can rotate around the battery fast-disassembly frame support.

Preferably, a control support further comprises a power connector, a power connector male head, adapter PCBs, an electronic speed regulator and a remote control signal receiver, and the power connector, the power connector male head, the adapter PCBs, the electronic speed regulator and the remote control signal receiver are integrated in the control support assembly through electrical connection; the power connector, the power connector male head, the adapter PCBs, the electronic speed regulator and the remote control signal receiver are arranged in the space defined by the electronic speed regulator box and the electronic speed regulator cover plate, a hole matched with the power connector male head is formed in the battery sliding rail support, the remote control signal receiver is used for receiving a signal and transmitting the signal to the electronic speed regulator, and the electronic speed regulator controls the current output to the traveling suspension part according to the intensity of the signal.

For enhancing communication signals between a remote control device of the electric skateboard and the electric skateboard and achieving effective control over the traveling state of the electric skateboard by the remote control device of the electric skateboard, at least one signal enhancement hole is formed in the electronic speed regulator box, and the signal enhancement hole is matched with a signal enhancement hole cover installed on the signal enhancement hole.

According to the optimized design of the battery sliding rail support, the battery sliding rail support at least comprises a battery sliding rail support body and second guide rail parts which are located on the two sides of the battery sliding rail support body and arranged oppositely.

The second guide rail parts are sheet assemblies with bending angles, a space for containing the battery assembly is formed by the two second guide rail parts, each second guide rail part can be divided into a first sheet body and a second sheet body located under the first sheet body, and the inner side face of the joint part of each first sheet body and the corresponding second sheet body protrudes outwards to form a second guide rail.

The second guide rails are matched with second sliding rail parts on a battery box shell constituting the battery assembly, and the battery assembly is installed on the battery sliding rail support through the sliding fit between the second sliding rail parts and the second guide rails.

For preventing the battery assembly from disengaging from the battery sliding rail support, the second guide rail parts of the battery sliding rail support are each provided with at least one index pin hole. The index pin holes are matched with index pins installed in the index pin holes, and the index pins are connected into the index pin holes in an inserted mode, so that the beneficial effect of preventing the battery assembly from disengaging from the battery sliding rail support is achieved.

For the connection between the battery sliding rail support and the electronic speed regulator box, preferably, a positioning mechanism is arranged on the joint part of the battery sliding rail support and the electronic speed regulator box, the positioning mechanism comprises positioning grooves formed in the battery sliding rail support and positioning bosses protruding out of the electronic speed regulator box, and the positioning bosses are connected into the positioning grooves in an inserted mode.

Furthermore, the battery sliding rail support and the electronic speed regulator box need to be connected in a fastened mode; according to a preferred fastened connection way, matched screw holes are formed in the electronic speed regulator box and the battery sliding rail support, and the electronic speed regulator box and the battery sliding rail support are connected in the fastened mode through screws.

Furthermore, the number of the adapter PCBs is two, one adapter PCB is close to the power connector male head, the adapter PCBs are fastened onto the electronic speed regulator cover plate, the remote control signal receiver is installed between the two adapter PCBs, and the adapter PCBs are connected with the electronic speed regulator through wires.

For the connection between the electronic speed regulator cover plate and the battery fast-disassembly frame support, preferably, the electronic speed regulator cover plate is connected with the battery fast-disassembly frame support in a fastened mode in advance and then connected with the electronic speed regulator box in a fastened mode.

According to a preferred implementation way, the battery fast-disassembly frame at least comprises a rotary combination part located at the end of the battery fast-disassembly frame, the rotary combination part is provided with an unthreaded shaft, the two ends of the unthreaded shaft can be inserted into rotating holes formed in the battery fast-disassembly frame support and can rotate, and the rotating holes are oppositely formed in the inner side of the battery fast-disassembly frame support.

Furthermore, the unthreaded shaft is at least sleeved with one triangular shaft with a triangular cross section, three parallel and independent triangular shaft holes are formed in the triangular shaft in the axial direction of the triangular shaft, and the unthreaded shaft can be inserted in any triangular shaft hole of the triangular shaft.

The electric skateboard of the invention is further provided with the battery assembly which is matched with the electric skateboard and is of an optimized structure. The battery assembly at least comprises a batter box shell, batteries and a battery connection female head, and the batteries and the battery connection female head are arranged in the batter box shell; a hole matched with the battery connection female head is formed in the batter box shell, the battery connection female head is matched with the power connector male head, and the batteries supply electric energy to the traveling suspension part through the electrical connection between the battery connection female head and the power connector male head.

According to further structural optimization of the battery assembly, the battery assembly further comprises a battery management protective board arranged in the battery box shell, the battery management protective board and the battery connection female head are integrated into a module, and current paths are formed by the batteries and the power connector male head through the integrated module of the battery management protective board and the battery connection female head.

According to a specific implementation way, the battery box shell is composed of a hollow trapezoid extruded part, an upper battery box cover and a lower battery box cover; the upper battery box cover is provided with a hole matched with the battery connection female head, the battery management protective board is arranged close to the upper battery box cover, the second sliding rail parts are arranged on the waist portions of the hollow trapezoid extruded part, the second sliding rail parts are composed of two second concave grooves formed by making the outer side faces of the waist portions of the hollow trapezoid extruded part sink inwards, the second concave grooves can contain the second guide rails of the second guide rail parts, and the second guide rail parts of the battery sliding rail support and the second sliding rail parts of the battery box shell form the second guide rail mechanisms.

The batteries in the battery box shell of the invention are arranged in order; preferably, a plurality of battery fastening positioning pieces are arranged on the inner surface of the hollow trapezoid extruded part, and the batteries are arranged on the battery fastening positioning pieces.

Preferably, the upper battery box cover and the lower battery box cover are fixedly connected with the hollow trapezoid extruded part through locking screws, so that the battery box shell is formed.

In another aspect, the invention further provides a remote control device matched with the electric skateboard, and the remote control device is used for controlling the traveling state of the detachable modular electric skateboard.

Preferably, the remote control device is handheld and transmits a communication signal to the remote control signal receiver of the power supply control part, and the remote control signal receiver transmits the communication signal to the electronic speed regulator, so that the traveling state of the traveling suspension part is controlled.

According to one implementation way of the remote control device for achieving control over the traveling suspension part, the remote control device transmits a pulse width modulation (PWM) signal to the remote control signal receiver, the remote control signal receiver transits a pulse code modulation (PCM) signal to the electronic speed regulator, and the waveform of driving currents output by the electronic speed regulator is sine waves.

Preferably, the communication signal transmitted by the remote control device is a 2.4 G PWM signal, and the communication signal is transmitted in a radio mode.

According to the structure of the remote control device, the remote control device at least comprises an upper remote control cover, a display screen, a display screen driving PCB, a remote control PCB, a remote control battery, a roller potentiometer and a lower remote control cover; the display screen and the display screen driving PCB are connected through a flexible flat cable, and the display screen driving PCB and the remote control PCB are connected in a wired mode.

Preferably, the upper remote control cover, the display screen, the display screen driving PCB, the remote control PCB, the remote control battery, the roller potentiometer and the lower remote control cover are fastened into one complete unit through screws; the control mode of the roller potentiometer is vector control.

Compared with existing electric skateboard and ordinary skateboards, the invention has the following beneficial effects or advantages in that:

The electric skateboard of the invention adopts the novel detachable design, integrates the advantages of the existing electric skateboard and the advantages of the ordinary skateboards, can replace daily vehicles driven by manpower and meanwhile can perfectly show the recreational significance of the ordinary skateboards serving as sports equipment. The electric skateboard is provided with two main function achieving modules, namely the detachable traveling suspension part and the power supply control part. When a user uses the electric skateboard for replacing walking, the user makes the traveling suspension part be connected to the board body through the bridge base connecting piece fixed to one end of the board body and makes the battery assembly be slidably connected with the control support assembly in the inserted mode at the same time, and the operating state of the electric skateboard is controlled through the remote control device. When the user uses the electric skateboard for achieving entertainment and playing and experiencing the basic function of the ordinary skateboards, the user directly dismounts the traveling suspension part from the board body and removes the battery assembly by sliding the battery assembly. Through the structural design of the traveling suspension part and the power supply control part, rapid dismounting and mounting by the user are facilitated (the user can complete mounting or dismounting of the modules in 15 seconds under the normal condition), dismounting and mounting are easy and convenient, the detachable modular electric skateboard integrates the advantages of the ordinary skateboards and the advantages of existing electric skateboards, and the user can conduct function switching according to personal requirements.

It can be known from the above description, the replaceable design is preferably adopted for the battery assembly constituting the power supply control part, the user can replace the battery assembly, and multiple battery assemblies can be carried with the user when the detachable modular electric skateboard is used for replacing walking for a long distance so that the endurance mileage can be greatly increased, convenience is provided to the user during long-distance traveling, and the technical defects that batteries of the existing electric skateboards cannot be replaced, and the charging time is long are overcome.

The hub motors of the electric skateboard of the invention are driven by sine-wave currents, so that starting is linear and smooth, a new user can master the electric skateboard more easily, and the feeling of the user experiencing the electric skateboard for the first time is fully considered.

In addition, various technological means are adopted by the invention for guaranteeing the reliability, safety and comfort of the overall design of the electric skateboard, for example, through the design that the damping plate spring is additionally arranged, a power wheel set of the traveling suspension part can be adapted to various road surfaces and obstacles, and the road holding force and the comfort are maintained; the index pin holes are formed in the second guide rail parts of the battery sliding rail support, and the index pins are connected into the index pin holes in the inserted mode, so that the battery assembly is prevented from disengaging from the battery sliding rail support; through the design of the anti-disengagement buckle on the suspension fast-disassembly support body, the suspension fast-disassembly support is effectively prevented from disengaging from the bridge base connecting piece.

Figure 1:
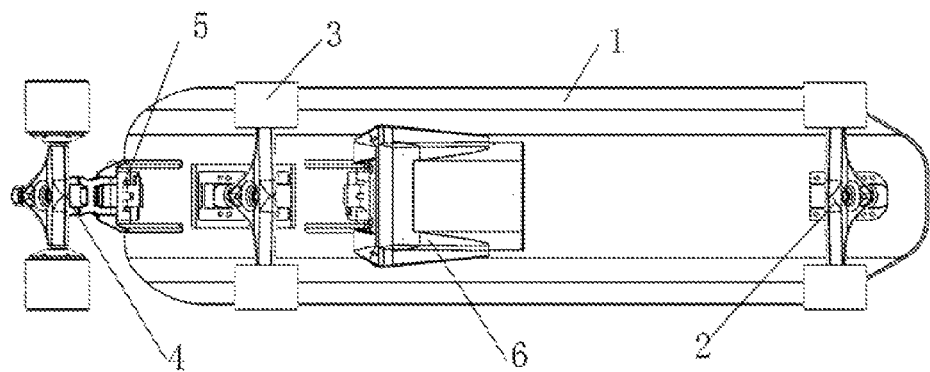
FIG. 1 is a planar schematic diagram of a detachable modular electric skateboard in one embodiment.

Description of markers in the drawings: 1. board body; 2. wheel frame; 3. wheel; 4. traveling suspension part; 5. first guide rail mechanism; 6. power supply control part; 7. bridge base connecting piece; 8. remote control device; 41. wheel frame; 42. bridge base; 43. suspension swing arm; 44. damping plate spring; 45. suspension fast-disassembly support; 46. wheel; 47. hub motor; 450. suspension fast-disassembly support body; 451. first guide rail part; 452. anti-disengagement buckle; 70. bridge base connecting piece body; 71. first sliding rail part; 61. control support assembly; 62. battery assembly; 610. battery sliding rail support; 611. electronic speed regulator box; 612. electronic speed regulator cover plate; 613. battery fast-disassembly frame support; 614. battery fast-disassembly frame support; 615. power connector; 616. power connector male head; 617. adapter PCB; 618. remote control signal receiver; 619. folded triangular shaft; 620. signal enhancement hole; 621. signal enhancement hole cover; 622. index pin hole; 6101. battery sliding rail support body; 6102. second guide rail part; 6103. first sheet body; 6104. second sheet body; 6105. second guide rail; 6100. positioning groove; 6110. positioning boss; 6111. screw hole; 6140. rotary combination part; 6141. unthreaded shaft; 6142. triangular shaft; 6143. rotating hole; 6200. battery box shell; 6201. battery connection female head; 6202. battery; 6203. second sliding rail part; 6204. second concave groove; 6205. upper battery box cover; 6206. lower battery box cover; 6207. battery fastening positioning piece; 6208. hollow trapezoid extruded part; 80. upper remote control cover; 81. display screen; 82. display screen driving PCB; 83. remote control PCB; 84. remote control battery; 85. roller potentiometer; 86. lower remote control cover.

DETAILED DESCRIPTION OF THE INVENTION

Further detailed description of the invention is given as follows with the accompanying drawings and embodiments.

For a convenient description, the leftward direction, the rightward direction, the upward direction and the downward direction referred hereinafter are consistent with the leftward direction, the rightward direction, the upward direction and the downward direction of the drawings. What needs to be indicated is that the embodiments of the invention and the characteristics in the embodiments can be mutually combined under the non-conflicting condition.

The embodiment provides a detachable modular electric skateboard, and the detachable modular electric skateboard has the main structure of an ordinary skateboard, namely the detachable modular electric skateboard comprises a board body 1 and wheel frames 2 arranged at the bottom of the board body 1, and wheels 3 are installed on the wheel frames 2. The physical power of a user is used as external power for advancing of the board body 1 of the ordinary skateboard. An existing electric skateboard has the main structure consistent with that of the ordinary skateboard, and batteries instead of manpower is used as external power of the existing electric skateboard. The wheels 3 of the existing electric skateboard and the ordinary skateboard are driven by external force to travel together with the board body 1 and the wheel frames 2.

The electric skateboard shown in FIG. 1 is different from the existing electric skateboard mainly in that the electric skateboard is provided with two external modules, namely a traveling suspension part 4 and a power supply control part 6. The two external modules adopt the detachable design and can be selectively installed on the board body 1 by the user according to requirements. As is shown in FIG. 1, the traveling suspension part 4 is installed at one end of the board body 1, the power supply control part 6 is installed at the bottom of the board body 1 and located on the portion between the two original wheel frames 2, and according to a preferred installation way, the power supply control part 6 can be installed closer to the traveling suspension part 4. The power supply control part 6 is provided with a detachably-installed battery assembly 62, and the battery assembly 62 is used for providing traveling driving force for the traveling suspension part 4.

Figure 2:
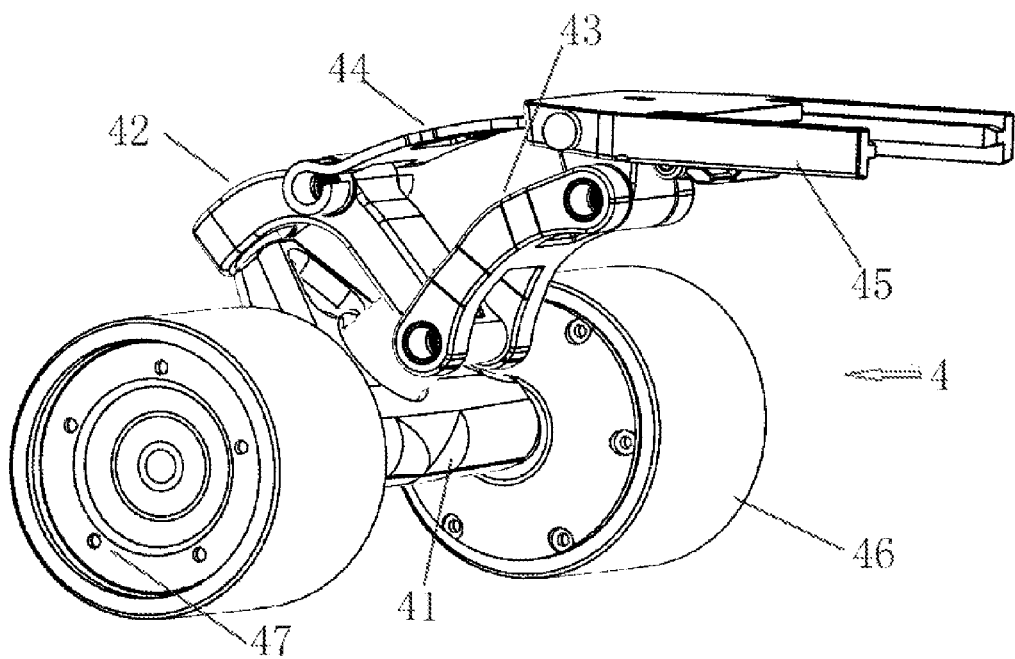
FIG. 2 is a three-dimensional structure schematic diagram of a traveling suspension part in one embodiment.

The structure of the traveling suspension part 4 is shown in FIG. 2, the traveling suspension part 4 can comprise a wheel frame 41 and wheels 46 installed at the two ends of the wheel frame 41, a bridge base 42 is arranged in the middle of the wheel frame 41, one end of a suspension swing arm 43 is connected to bridge base 42, the other end of the suspension swing arm 43 is connected with one end of a suspension fast-disassembly support 45, and the suspension fast-disassembly support 45 is detachably installed at one end of the board body 1. The wheels 46 arranged at the two ends of the wheel frame 41 form a power wheel set of the traveling suspension part 4, hub motors 47 are integrated in the wheels 46, and the power wheel set drives the board body 1 and a connecting piece of the board body 1 through the traveling suspension part 4 to travel integrally.

A damping plate spring 44 of the connecting bridge base 42 and the suspension fast-disassembly support 45 is also shown in FIG. 2. Specifically, one end of the damping plate spring 44 is arranged at the top of the bridge base 42, the other end of the damping plate spring 44 is connected with one end of the suspension fast-disassembly support 45, and the damping plate spring 44 and the suspension swing arm 43 are connected with the same end of the suspension fast-disassembly support 45. The damping plate spring 44 is additionally arranged mainly for making the power wheel set (the wheels 46) of the traveling suspension part 4 adaptable to various road surfaces and obstacles and keeping the road holding force and the comfort. In addition, according to one specific implementation way, the damping plate spring 44 is arranged above the suspension swing arm 43, and a triangular assembly is formed by the damping plate spring 44, the bridge base 42 and the suspension swing arm 43. Through the triangular assembly is formed by the damping plate spring 44, the bridge base 42 and the suspension swing arm 43, the overall structural stability and firmness of the traveling suspension part 4 are improved, and accordingly the safety performance of the electric skateboard is improved.

A bridge connecting piece 7 is fixed to the board body 1 and is a transition piece for achieving detachable connection between the board body 1 and the traveling suspension part 4. The bridge connecting piece 7 is preferably made of a light material, and thus the weight of the electric skateboard is prevented from being increased.

Figure 3:
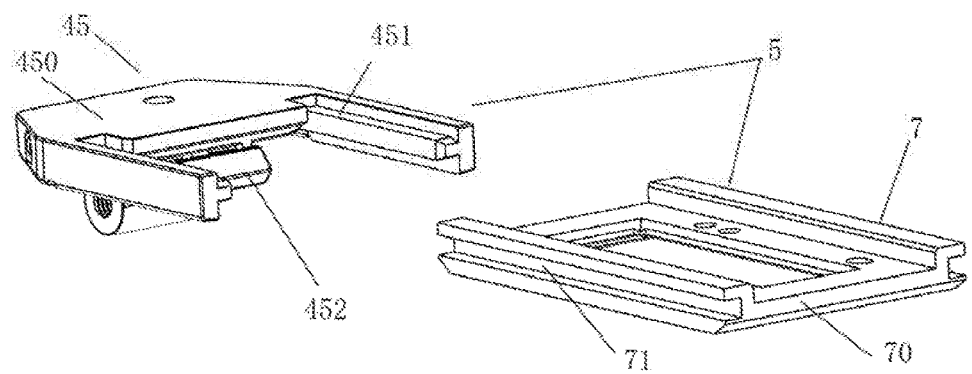
FIG. 3 is a structure schematic diagram of a suspension fast-disassembly support, a bridge base connecting piece and first guide rail mechanisms formed by the suspension fast-disassembly support and the bridge base connecting piece in one embodiment.

FIG. 3 shows a mode of the detachable connection between the suspension fast-disassembly support 45 and the bridge base connecting piece 7. What needs to be pointed out is that the suspension fast-disassembly support 45 and the bridge base connecting piece 7 can be detachably connected in various ways, and the slidable inserted connection way shown in FIG. 3 is a preferred connection mode. First guide rail mechanisms 5 for achieving slidable inserted connection are formed between the suspension fast-disassembly support 45 and the bridge base connecting piece 7.

For describing the specific composition of the first guide rail mechanisms 5 conveniently, a detailed description of the structure of the suspension fast-disassembly support 45 and the structure of the bridge base connecting piece 7 is given firstly. As is shown in FIG. 3, the suspension fast-disassembly support 45 can be subdivided into a suspension fast-disassembly support body 450 and first guide rail parts 451. The suspension fast-disassembly support body 450 is used for connecting the traveling suspension part 4 with other constituent parts, and the first guide rail parts 451 are located on the two sides of the suspension fast-disassembly support body 450 and arranged oppositely. The first guide rail parts 451 are part of components constituting the first guide rail mechanisms 5. The opposite inner surfaces of the inner sides of the first guide rail parts 451 protrude to form first guide rails (not marked in FIG. 3).

The bridge base connecting piece 7 can be divided into a bridge base connecting piece body 70 and first sliding rail parts 71. The first sliding rail parts 71 are oppositely arranged on the two sides of the bridge base connecting piece body 70, and the opposite outer surfaces of the outer sides of the first sliding rail parts 71 are sunken inwards to form first concave grooves (not marked in FIG. 3) for containing the first guide rails. The first guide rail parts 451 of the suspension fast-disassembly support 45 and the first sliding rail parts 71 of the bridge base connecting piece 7 form the first guide rail mechanisms 5. When the suspension fast-disassembly support 45 is mounted, the first guide rails slide to the tail ends of the first concave grooves along the first concave grooves, and then installation of the traveling suspension part 4 is completed. The traveling suspension part 4 can be dismounted from the board body 1 in the sequence opposite to the installation sequence, namely the first guide rail parts 451 of the suspension fast-disassembly support 45 is slid away from the first sliding rail parts 71 of the bridge base connecting piece 7. Obviously, through the structural design of the traveling suspension part 4, rapid dismounting and mounting by a user are facilitated, and the user can complete mounting or dismounting of the traveling suspension part 4 in 15 seconds under the normal condition.

Furthermore, for preventing the suspension fast-disassembly support 45 from disengaging from the bridge base connecting piece 7, an anti-disengagement mechanism is arranged on the suspension fast-disassembly support 45. According to a preferred implementation way, the anti-disengagement mechanism is an anti-disengagement buckle 452 arranged on the suspension fast-disassembly support body 450 between the first guide rail parts 451. The anti-disengagement buckle 452 is connected to the bridge base connecting piece body 70 between the first sliding rail parts 451. Through the design of the anti-disengagement buckle 452, the suspension fast-disassembly support 45 is effectively prevented from disengaging from the bridge base connecting piece 7, and the firmness and reliability of the combination of the traveling suspension part 4 and the board body 1 are further improved. What needs to be indicated is that the implementation way for additionally arranging the anti-disengagement buckle 452 on the suspension fast-disassembly support 45 is only one of multiple implementation ways for achieving disengagement prevention, and those ordinarily skilled in the art can adopt the same way or other similar ways having the same purpose for achieving disengagement prevention according to the design idea of the invention.

Figure 4:
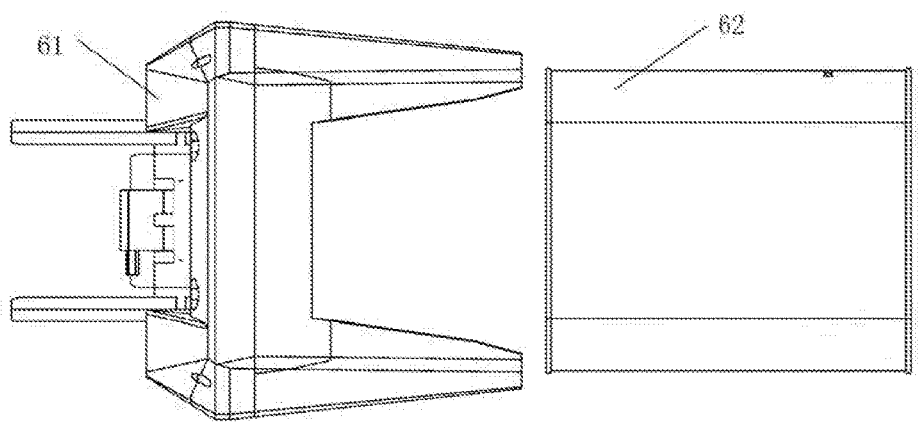
FIG. 4 is a state schematic diagram of a control support assembly and a battery assembly, before installation, which constitute a power supply control part in one embodiment.
Figure 5:
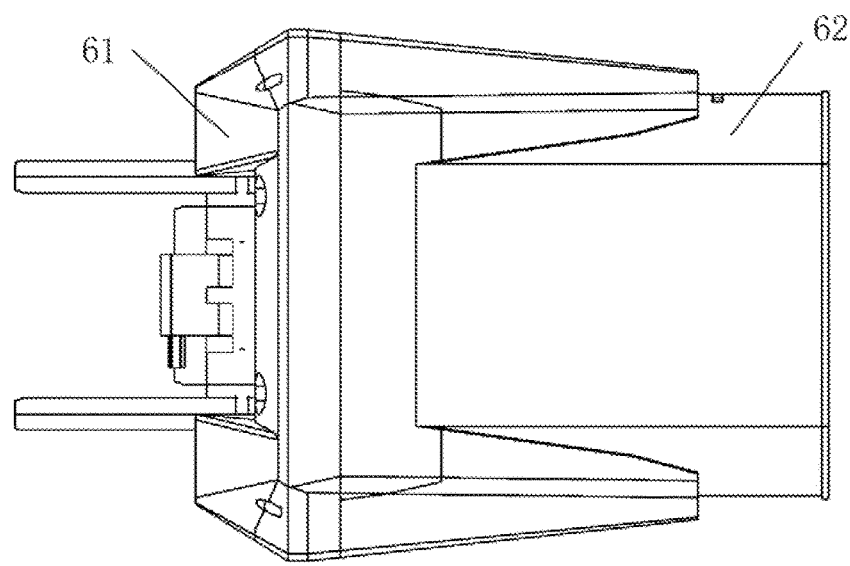
FIG. 5 is a state schematic diagram of the control support assembly and the battery assembly, installed into a whole, which constitute the power supply control part in one embodiment.

The overall structure and assembly state of the power supply control part 6 are shown in FIG. 4 and FIG. 5. The power supply control part 6 can be simply divided into a battery assembly 62 and a control support assembly 61. The control support assembly 61 is fixed to the bottom of the board body 1 and used for containing the battery assembly 62 and can control the advancing state of the traveling suspension part 4.

The control support assembly 61 and the battery assembly 62 are detachably connected, namely the battery assembly 62 is replaceable, and the battery assembly 62 can be mounted or dismounted the according to the requirements of the user. According to a preferred detachable connection way, matched second guide rail mechanisms (not marked in FIG. 4 and FIG. 5) are designed between the control support assembly 61 and the battery assembly 62, and slidable inserted connection between the battery assembly 62 and the control support assembly 61 is achieved through the second guide rail mechanisms.

Figure 6:
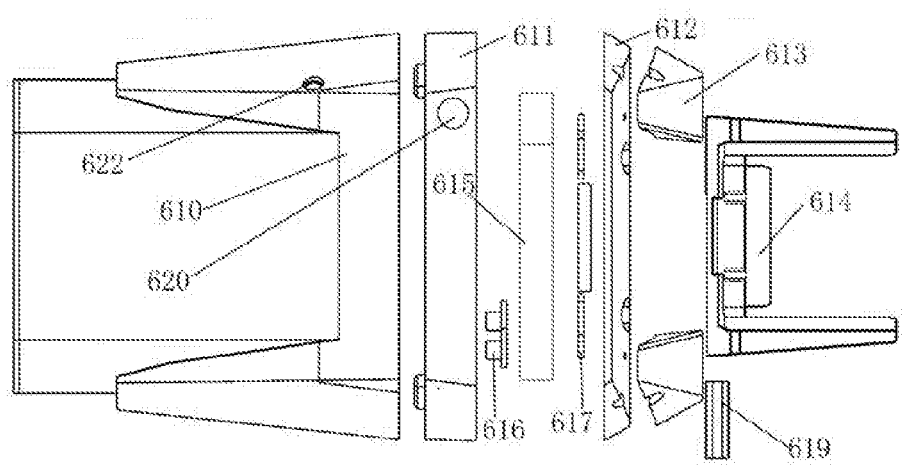
FIG. 6 is an installation composition explosive view of the control support assembly in one embodiment.

The control support assembly 61 is of a segmental connection structure, namely the control support assembly 61 is composed of a plurality of constituent parts. As is shown in FIG. 6, the control support assembly 61 can comprise a battery sliding rail support 610, an electronic speed regulator box 611, an electronic speed regulator cover plate 612, a battery fast-disassembly frame support 613 and a battery fast-disassembly frame 614. All the constituent parts constituting the control support assembly 61 are connected into a whole in a fastened mode through screws. The second guide rail mechanisms are formed through the cooperation between the battery sliding rail support 610 and the battery assembly 62, namely the battery assembly 62 is slidably connected to the battery sliding rail support 610 in an inserted mode.

A power connector 615, a power connector male head 616, adapter PCBs 617, an electronic speed regulator (not marked in FIG. 6) and a remote control signal receiver 618 are further installed in the space defined by the electronic speed regulator box 611 and the electronic speed regulator cover plate 612.

Figure 9:
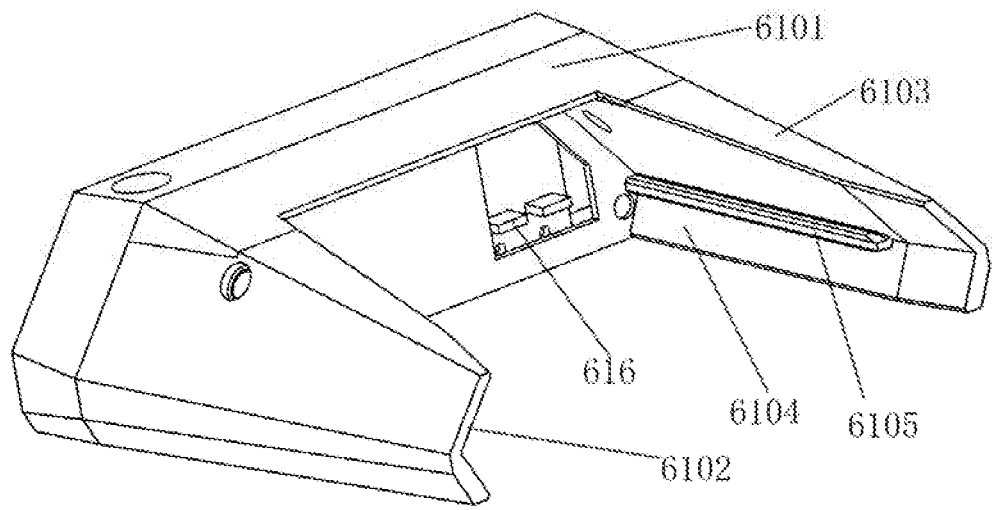
FIG. 9 is a structure schematic diagram of second guide rail parts of a battery sliding rail support in one embodiment.

The power connector male head 616 is matched with the battery assembly 62 and is a connector for achieving current output of the battery assembly 62. As is shown in FIG. 9, a hole matched with the power connector male head 616 is formed in the battery sliding rail support 610, and the power connector male head 616 is connected into the hole, matched with the power connector male head 616, formed in the battery sliding rail support 610 in an inserted mode.

Figure 10:
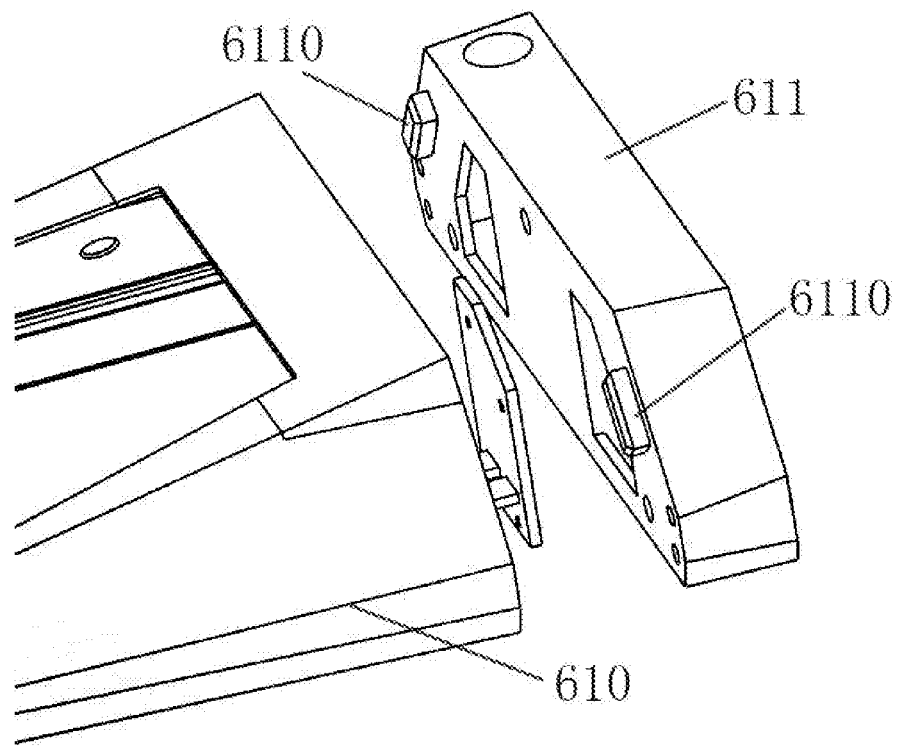
FIG. 10 is a schematic diagram of positioning bosses arranged on electronic speed regulator box in one embodiment.
Figure 11:
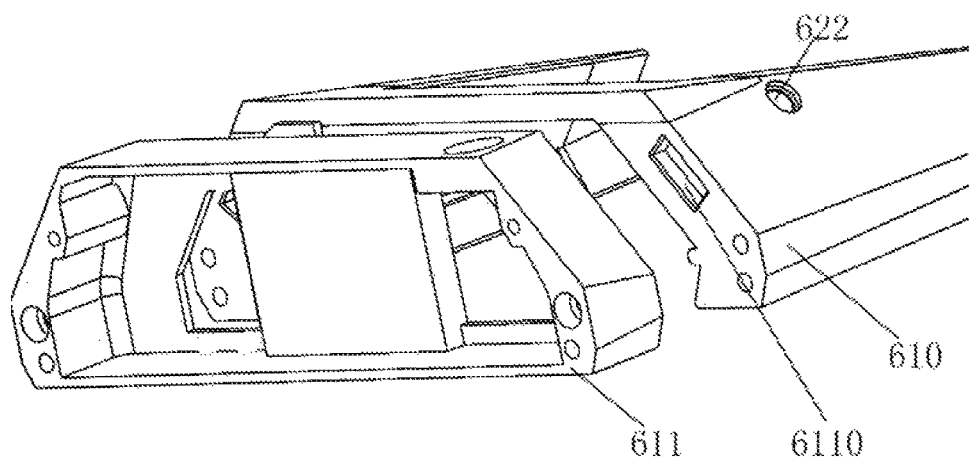
FIG. 11 is a schematic diagram of positioning grooves formed in the battery sliding rail support in one embodiment.
Figure 12:
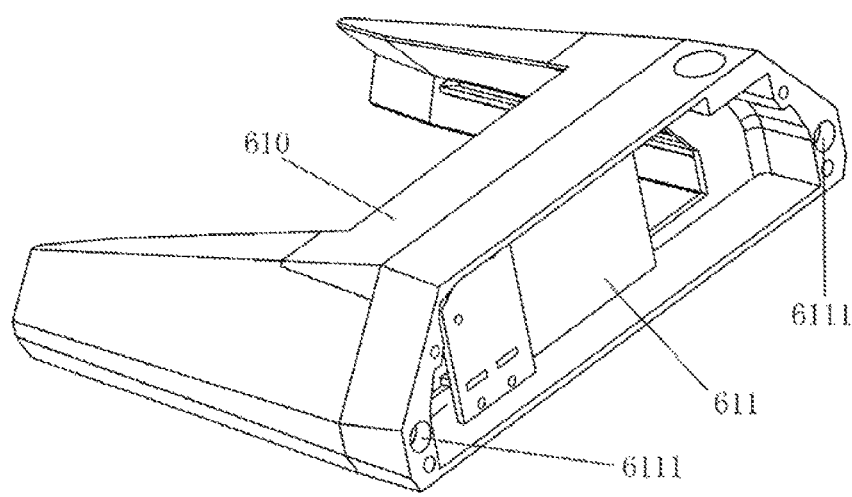
FIG. 12 is a schematic diagram of fastened connection between the battery sliding rail support and the electronic speed regulator box in one embodiment.

As is shown in FIG. 12, the battery sliding rail support 610 and the electronic speed regulator box 611 are connected in a fastened mode through screws, and matched screw holes 6111 are formed in the battery sliding rail support 610 and the electronic speed regulator box 611. For assembling the battery sliding rail support 610 and the electronic speed regulator box 611 conveniently, a positioning mechanism is arranged on the joint part of the battery sliding rail support 610 and the electronic speed regulator box 611. As is shown in FIG. 10 and FIG. 11, the positioning mechanism is composed of positioning bosses 6110 and positioning grooves 6100, the positioning bosses 6110 are fixedly connected to the electronic speed regulator box 611, the positioning grooves 6100 are formed in the battery sliding rail support 610, and the positioning bosses 6110 are connected into the positioning grooves 6100 in an inserted mode.

Figure 13:
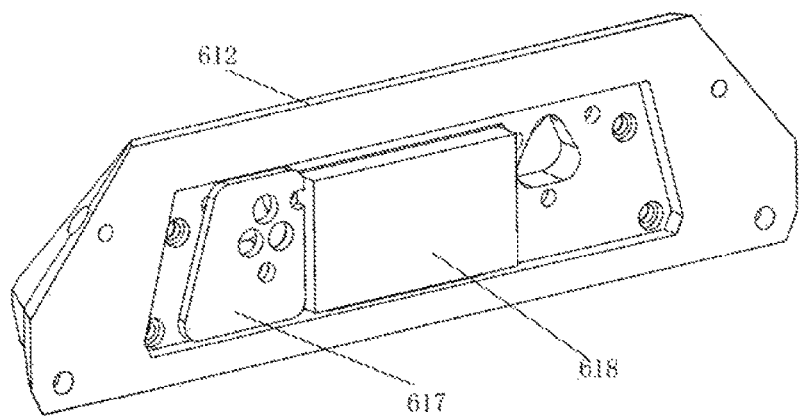
FIG. 13 is a schematic diagram of the installation positions of adapter PCBs and a remote control signal receiver on an electronic speed regulator cover plate in one embodiment.
Figure 14:
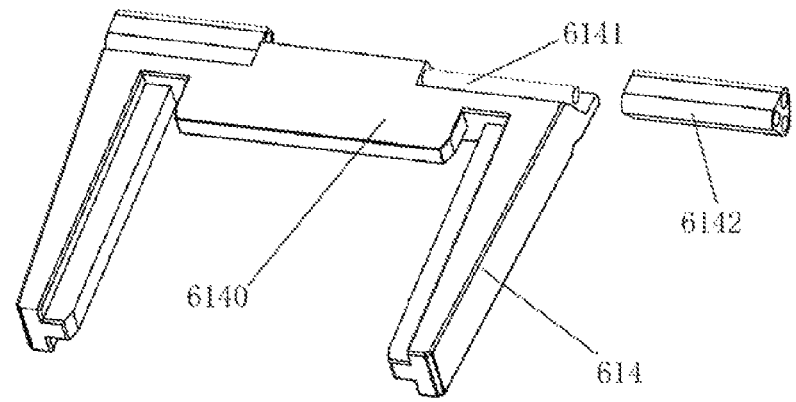
FIG. 14 is a structure schematic diagram of a battery fast-disassembly frame and a triangular shaft matched with the battery fast-disassembly frame in one embodiment.
Figure 15:
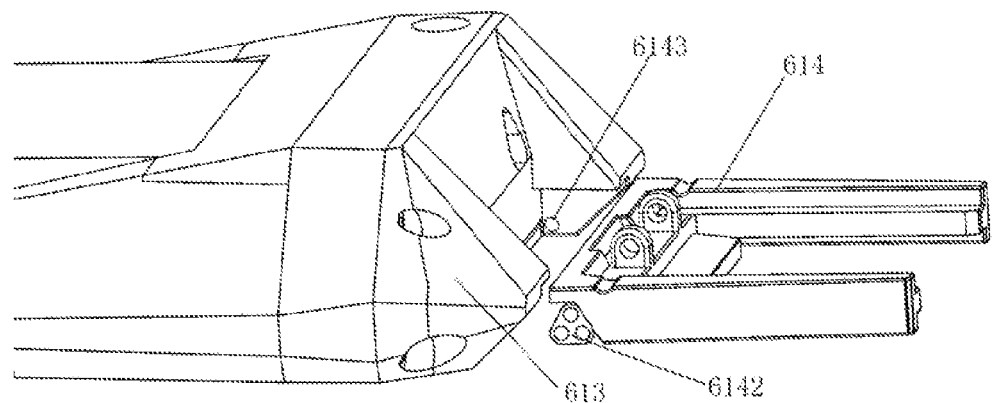
FIG. 15 is a state schematic diagram of the battery fast-disassembly frame and a battery fast-disassembly frame support before assembly in one embodiment.
Figure 16:
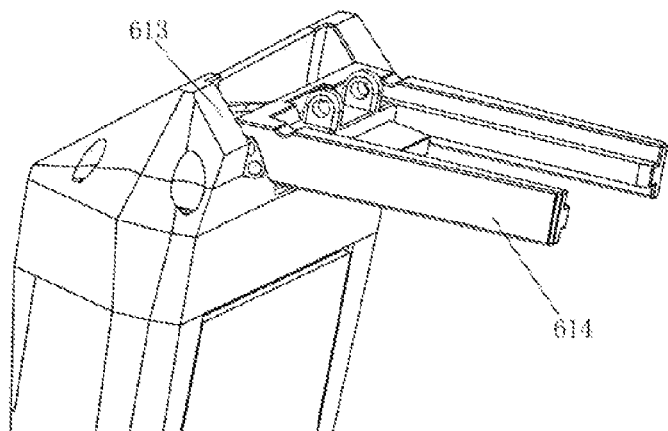
FIG. 16 is a first state schematic diagram of the battery fast-disassembly frame rotating around the battery fast-disassembly frame support in one embodiment.
Figure 17:
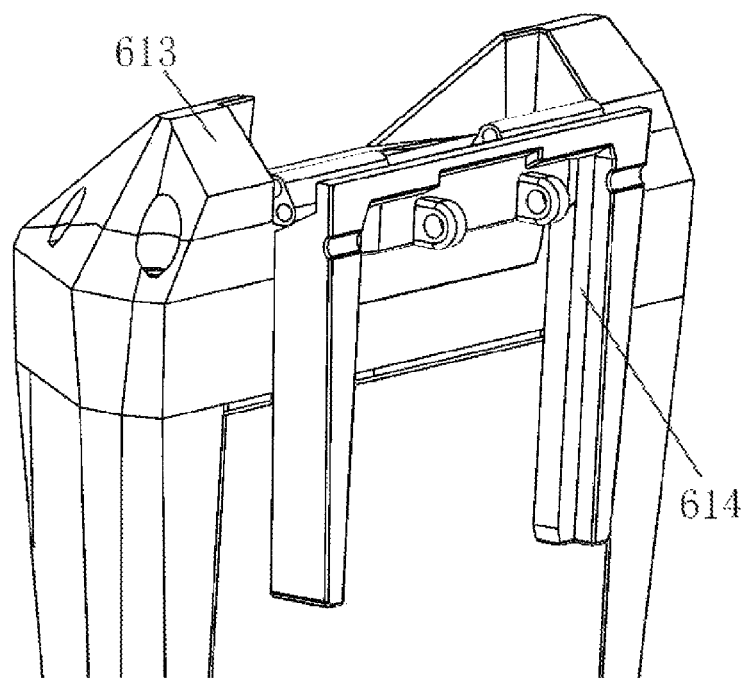
FIG. 17 is a second state schematic diagram of the battery fast-disassembly frame rotating around the battery fast-disassembly frame support in one embodiment.

The two adapter PCBs 617 are arranged in the control support assembly 61, one adapter PCB 617 is close to the power connector male head 616, and the adapter PCBs 617 are fastened onto the electronic speed regulator cover plate 612 through screws. As is shown in FIG. 13, the remote control signal receiver 618 is installed between the two adapter PCBs 617, and the adapter PCBs 617 are connected with the electronic speed regulator through wires.

According to the connection way of the electronic speed regulator cover plate 612, the electronic speed regulator cover plate 612 and the battery fast-disassembly frame support 613 are connected in a fastened mode through screws in advance, and then the electronic speed regulator cover plate 612 and the battery fast-disassembly frame support 613 are connected with the electronic speed regulator box 611 in a fastened mode as a whole.

The embodiment provides a rotary connection way to serve as the connection way of the battery fast-disassembly frame support 613 and the battery fast-disassembly frame 614, namely the battery fast-disassembly frame 614 can rotate around the battery fast-disassembly frame support 613. As is shown in FIG. 14 to FIG. 17, the battery fast-disassembly frame 614 can rotate around the battery fast-disassembly frame support 613 and can be in different rotating states. The battery fast-disassembly frame 614 at least comprises a rotary combination part 6140 located at the end of the battery fast-disassembly frame 614, an unthreaded shaft 6141 is fixed to the rotary combination part 6140, the two ends of the unthreaded shaft 6141 can be inserted into rotating holes 6143 formed in the battery fast-disassembly frame support 613 and can rotate, and the rotating holes are oppositely formed in the inner side of the battery fast-disassembly frame support 613. For achieving the effect that the rotation of the battery fast-disassembly frame 614 is in different stages, the two sides of the unthreaded shaft 6141 are each sleeved with a triangular shaft 6142 (namely the folded triangular shafts 619 in FIG. 6) with a triangular cross section. Three parallel and independent triangular shaft holes are formed in each triangular shaft 6142 in the axial direction of the triangular shaft 6142, and the unthreaded shaft 6141 can be inserted into any triangular shaft hole of each triangular shaft 6142. Through the rotating design of the battery fast-disassembly frame 614, the purpose of reducing the occupied space through folding during storage is achieved.

As is shown in FIG. 9, the embodiment provides the optimized design of the battery sliding rail support 610. The battery sliding rail support 610 at least comprises a battery sliding rail support body 6101 and second guide rail parts 6102 which are located on the two sides of the battery sliding rail support body 6101 and arranged oppositely. Specifically, the second guide rail parts 6102 are sheet assemblies with bending angles, a space for containing the battery assembly 62 is formed by the two second guide rail parts 6102, each second guide rail part 6102 can be divided into a first sheet body 6103 and a second sheet body 6104 located under the first sheet body 6103, and the inner side face of the joint part of each first sheet body 6104 and the corresponding second sheet body 6104 protrudes outwards to form a second guide rail 6105.

The second guide rails 6105 are matched with second sliding rail parts 6203 on a battery box shell 6200 constituting the battery assembly 62, and the battery assembly 62 is installed on the battery sliding rail support 610 through the sliding fit between the second sliding rail parts 6203 and the second guide rails 6105.

Figure 8:
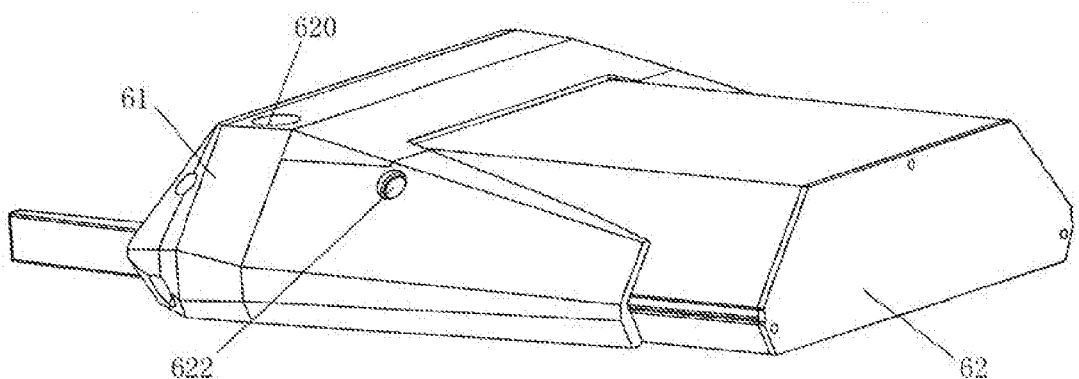
FIG. 8 is a schematic diagram of the power supply control part provided with index pin holes in one embodiment.

As is shown in FIG. 8, for preventing the battery assembly 62 from disengaging from the battery sliding rail support 610, the second guide rail parts 6102 of the battery sliding rail support 610 are each provided with one index pin hole 622. Index pins can be connected into the index pin holes 622 in an inserted mode, so that the beneficial effect of preventing the battery assembly 62 from disengaging from the battery sliding rail support 610 is achieved.

Figure 18:
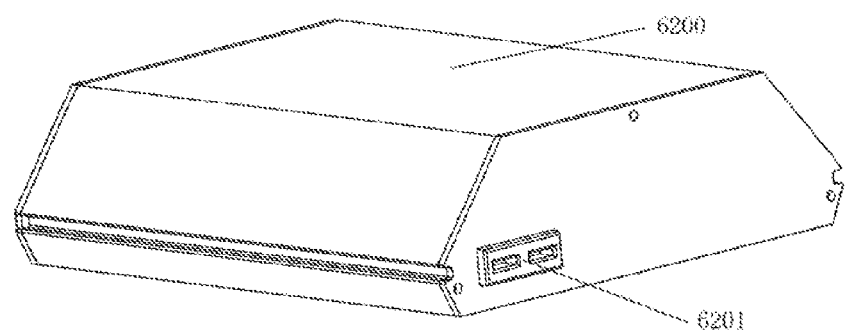
FIG. 18 is a structure schematic diagram of the battery assembly in one embodiment.

The embodiment further provides the structural design of the battery assembly 62 matched with the battery sliding rail support 610. The outline structure of the battery assembly 62 is shown in FIG. 18. The battery assembly 62 at least structurally comprises a batter box shell 6200, batteries 6202 and a battery connection female head 6201, and the batteries 6202 and the battery connection female head 6201 are arranged in the batter box shell 6200. As is shown in FIG. 18, a hole matched with the battery connection female head 6201 is formed in the batter box shell 6200, and the battery connection female head 6201 is installed in the battery box shell 6200. The batteries 6202 supply electric energy to the traveling suspension part 4 through the electrical connection between the battery connection female head 6201 and the power connector male head 616. Preferably, the battery assembly 62 further comprises a battery management protective board (not marked in FIG. 18) which is arranged in the battery box shell 6200. The battery management protective board and the battery connection female head 6201 are integrated into a module, and current paths are formed by the batteries 6202 and the power connector male head 616 through the integrated module of the battery management protective board and the battery connection female head 6201.

Figure 19:
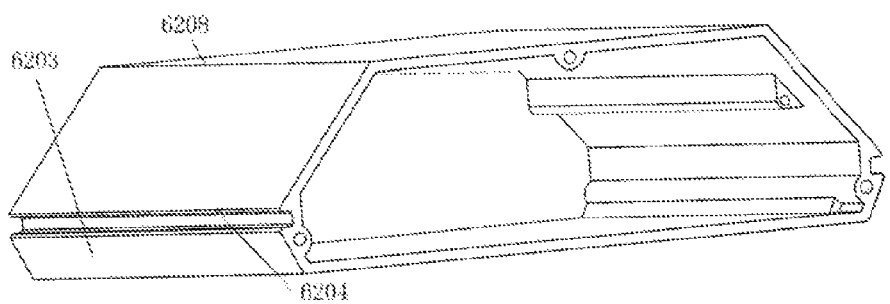
FIG. 19 is a structure schematic diagram of a hollow trapezoid extruded part of a battery box shell in one embodiment.
Figure 20:
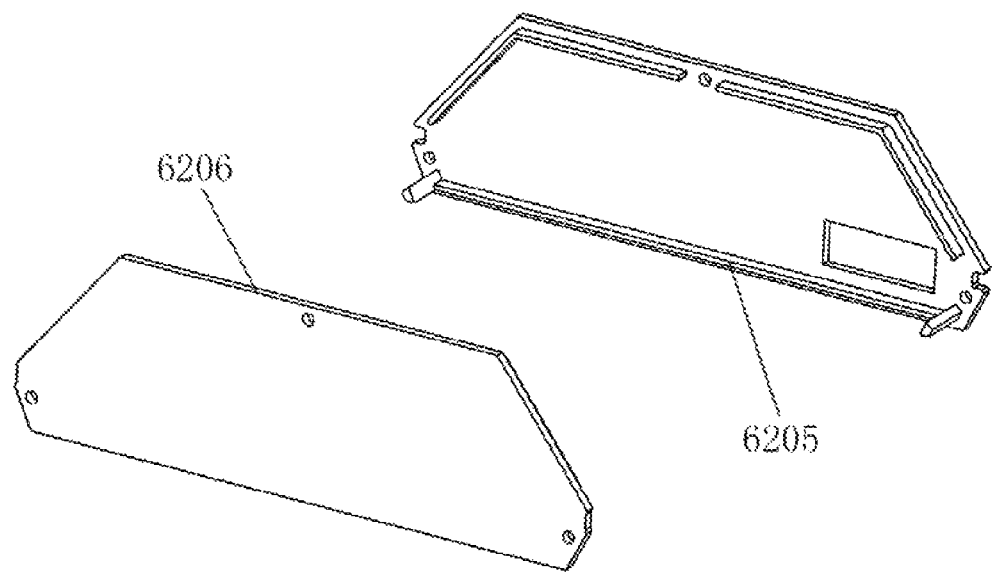
FIG. 20 is a structure schematic diagram of an upper battery box cover and a lower battery box cover of the battery box shell in one embodiment.

The specific structure of the battery box shell 6200 is shown in FIG. 19 and FIG. 20. The battery box shell 6200 is composed of a hollow trapezoid extruded part 6208, an upper battery box cover 6205 and a lower battery box cover 6206. Preferably, the upper battery box cover 6205 and the lower battery box cover 6206 are fixedly connected with the hollow trapezoid extruded part 6208 through locking screws, so that the battery box shell 6200 is formed. Specifically, a hole matched with the power connector male head 616 is formed in the upper battery box cover 6205. The battery management protective board is arranged close to the upper battery box cover 6205. The second sliding rail parts 6203 are arranged on the waist portions of the hollow trapezoid extruded part 6208, and the second sliding rail parts 6203 are composed of two second concave grooves 6204 formed by making the outer side faces of the waist portions of the hollow trapezoid extruded part 6208 sink inwards. The second concave grooves 6204 can contain the second guide rails 6205 of the second guide rail parts 6203. The second guide rail parts 6203 of the battery sliding rail support 610 and the second sliding rail parts 6203 of the battery box shell 6200 form the second guide rail mechanisms.

Figure 21:
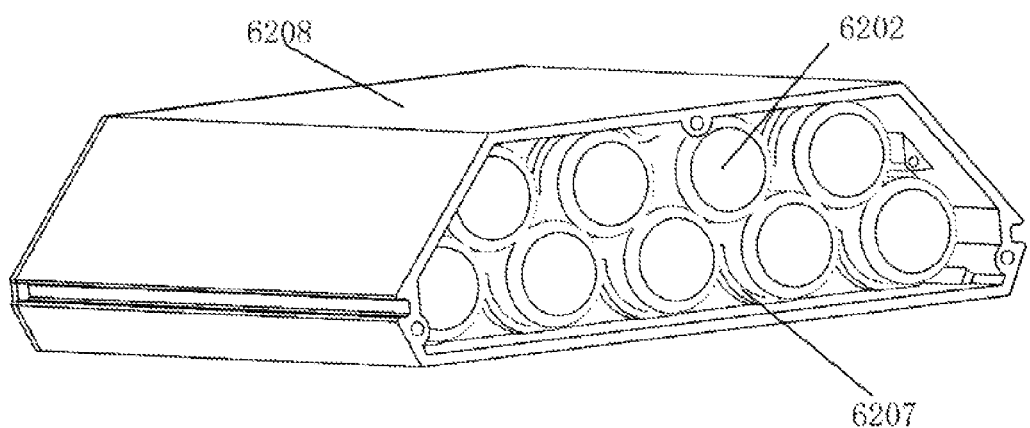
FIG. 21 is a schematic diagram of the arrangement of batteries in the hollow trapezoid extruded part in one embodiment.

As is shown in FIG. 21, the batteries 6202 are arranged in the battery box shell 6200 in order, and preferably, the batteries 6202 are arranged in the battery box shell 6200 in two rows. A plurality of battery fastening positioning pieces 6207 are arranged on the inner surface of the hollow trapezoid extruded part 6208, and the batteries 6202 are arranged on the battery fastening positioning pieces 6207 in order.

The embodiment further provides a remote control device used for controlling the traveling state of the electric skateboard. As is show in FIG. 22, the remote control device 8 is handheld and at least comprises an upper remote control cover 80, a display screen 81, a display screen driving PCB 82, a remote control PCB 83, a remote control battery 84, a roller potentiometer 85 and a lower remote control cover 86, wherein the display screen 81 and the display screen driving PCB 82 are connected through a flexible flat cable, and the display screen driving PCB 82 and the remote control PCB 83 are connected in a wired mode. A hole matched with the display screen 81 is formed in the upper remote control cover 80. All the components of the remote control device 8 are fastened into one complete unit through screws.

According to the operating way of the remote control device 8, the electric skateboard is accelerated by rotating the roller potentiometer 85 anticlockwise, vector control is adopted, and the acceleration of the electric skateboard is determined according to the rotation of the roller potentiometer 85. Braking can be achieved by rotating the roller potentiometer 85 clockwise, and vector control is also adopted.

Figure 22:
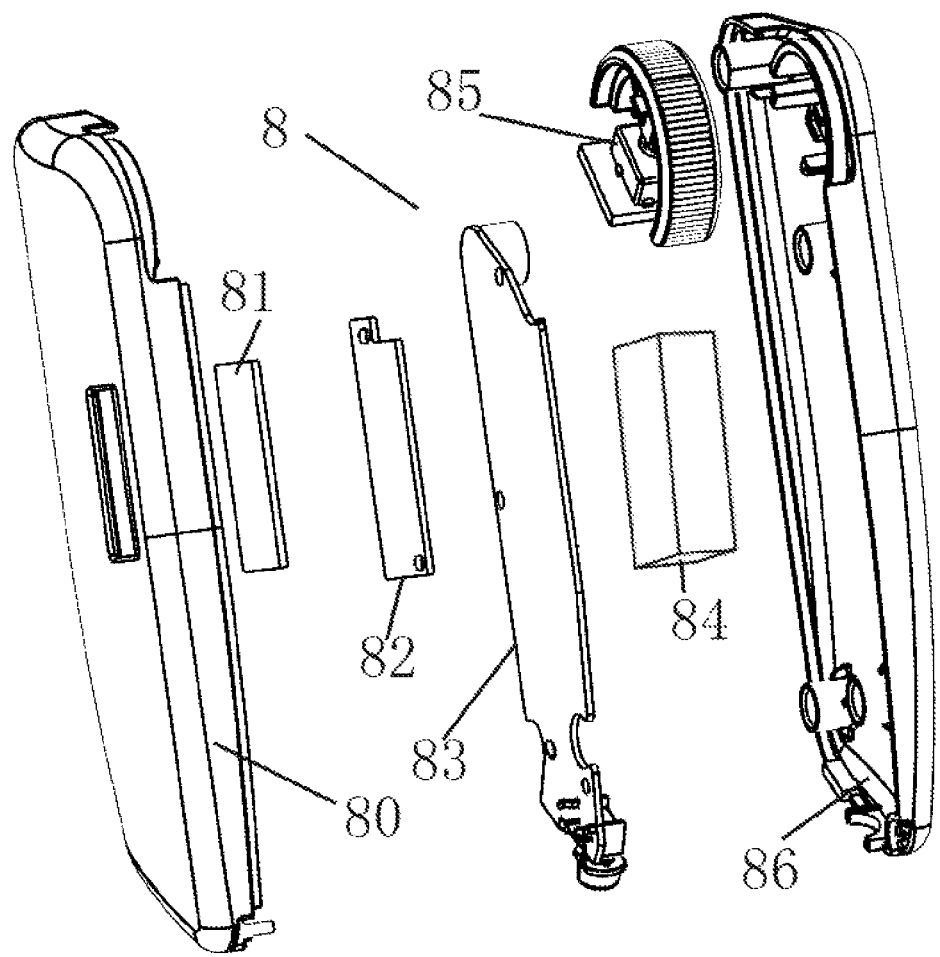
FIG. 22 is an installation composition explosive view of a remote control device of the detachable modular electric skateboard in one embodiment.

By the adoption of the remote control device 8 shown in FIG. 22, a communication signal can be transmitted to the remote control signal receiver 618 of the power supply control part 6, and the remote control signal receiver 618 transmits the communication signal to the electronic speed regulator so as to control the traveling state of the traveling suspension part 4. The remote control signal receiver 618 receives the signal and transmits the signal to the electronic speed regulator, and the electronic speed regulator controls the current output to the traveling suspension part 4 according to the intensity of the signal.

Figure 7:
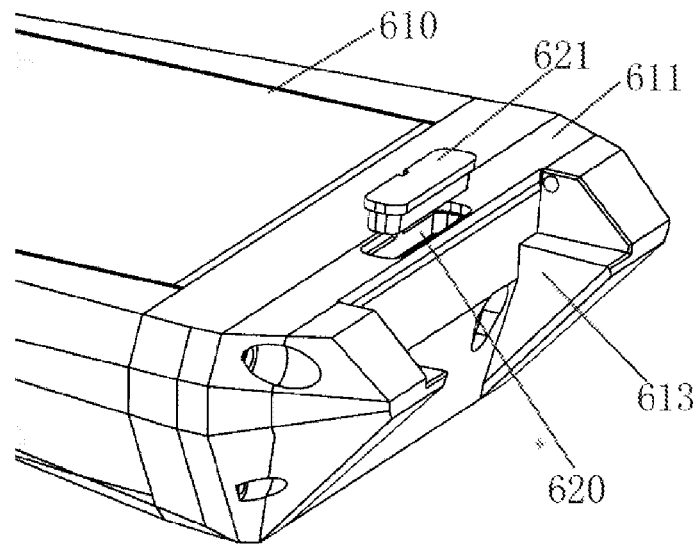
FIG. 7 is a local structure schematic diagram of the control support assembly in one embodiment.

Since the control support assembly 61 is generally a metal piece, the remote control device 8 and the control support assembly 61 are in radio communication, and a radio signal can be shielded by the metal structure, a window needs to be arranged to serve as a radio communication channel, however, the radio signal cannot be shielded by plastic materials. In this way, as is shown in FIG. 7, for enhancing the communication signal between the remote control device 8 of the electric skateboard and the electric skateboard and achieving effective control over the traveling state of the electric skateboard by the remote control device 8 of the electric skateboard, at least one signal enhancement hole 620 is formed in the electronic speed regulator box 611, and the signal enhancement hole 620 is matched with a signal enhancement hole cover 621 installed at the signal enhancement hole. The signal enhancement hole cover 621 is preferably a plastic structural piece.

According to the optimization of the communication signal, the remote control device 8 transmits a pulse width modulation (PWM) signal to the remote control signal receiver 618, the remote control signal receiver 618 transits a pulse code modulation (PCM) signal to the electronic speed regulator, and driving currents output by the electronic speed regulator are sine waves. Specifically, the communication signal transmitted by the remote control device 8 is a 2.4 G PWM signal, and the communication signal is transmitted in a radio mode.

In the description, the reference terms such as 'embodiment', 'example', 'specific embodiment' and 'certain examples' refer to that specific methods or devices or characteristics which are described in the embodiments or examples are included in at least one embodiment or example of the invention. Furthermore, in the description, illustrative description of the above terms does not have to aim at the same embodiment or example, and the described specific characteristics or methods or devices or characteristics can be properly combined in one or more embodiment or example. In addition, under the non-contradictory condition, those ordinarily skilled in the art can combine the different embodiments or examples described in the description and combine the characteristics described in the different embodiments or examples.

Further description of the invention is given above with the embodiments, but the invention is not limited by the above embodiments, and various changes can be made without deviating from the purpose of the invention within the knowledge range of those ordinarily skilled in the art.

What is claimed is:

1. A detachable modular electric skateboard, comprising a board body and wheel frames arranged at the bottom of the board body and provided with wheels driven by external force to travel together with the board body and the wheel frames, characterized in that the detachable modular electric skateboard further comprises a traveling suspension part and a power supply control part, wherein the traveling suspension part is detachably installed at the end of the board body, the power supply control part is arranged at the bottom of the board body, and the power supply control part is provided with a detachably-installed battery assembly, wherein the traveling suspension part at least comprises a wheel frame, wheels, a bridge base, a suspension swing arm and a suspension fast-disassembly support; the wheels are arranged at the two ends of the wheel frame, hub motors are integrated in the wheels, the bridge base is arranged on the wheel frame, the two ends of the suspension swing arm are connected with the base portion of the bridge base and one end of the suspension fast-disassembly support correspondingly, and the suspension fast-disassembly support is detachably installed at the end of the board body, wherein the traveling suspension part further comprises a damping plate spring, one end of the damping plate spring is arranged at the top of the bridge base, the other end of the damping plate spring is connected with one end of the suspension fast-disassembly support, and the damping plate spring and the suspension swing arm are connected with the same end of the suspension fast-disassembly support.

2. The detachable modular electric skateboard according to claim 1, characterized in that the damping plate spring is located above the suspension swing arm, and a triangular assembly is formed by the damping plate spring, the bridge base and the suspension swing arm.

3. A detachable modular electric skateboard, comprising a board body and wheel frames arranged at the bottom of the board body and provided with wheels driven by external force to travel together with the board body and the wheel frames, characterized in that the detachable modular electric skateboard further comprises a traveling suspension part and a power supply control part, wherein the traveling suspension part is detachably installed at the end of the board body, the power supply control part is arranged at the bottom of the board body, and the power supply control part is provided with a detachably-installed battery assembly, wherein the traveling suspension part at least comprises a wheel frame, wheels, a bridge base, a suspension swing arm and a suspension fast-disassembly support; the wheels are arranged at the two ends of the wheel frame, hub motors are integrated in the wheels, the bridge base is arranged on the wheel frame, the two ends of the suspension swing arm are connected with the base portion of the bridge base and one end of the suspension fast-disassembly support correspondingly, and the suspension fast-disassembly support is detachably installed at the end of the board body, wherein a bridge base connecting piece matched with the suspension fast-disassembly support is arranged at the end of the board body, and the bridge base connecting piece is detachably connected with the suspension fast-disassembly support.

4. The detachable modular electric skateboard according to claim 3, characterized in that the suspension fast-disassembly support is slidably connected with the bridge base connecting piece in an inserted mode, matched first guide rail mechanisms are arranged on the two sides of the suspension fast-disassembly support and the two sides of the bridge base connecting piece, and the suspension fast-disassembly support and the bridge base connecting piece are slidably connected into a whole through the first guide rail mechanisms on the sides of the suspension fast-disassembly support and the sides of the bridge base connecting piece.

5. The detachable modular electric skateboard according to claim 4, characterized in that the suspension fast-disassembly support at least comprises a suspension fast-disassembly support body and first guide rail parts which are located on the two sides of the suspension fast-disassembly support body and arranged oppositely, and the opposite inner surfaces of the inner sides of the first guide rail parts protrude to form first guide rails; the bridge base connecting piece at least comprises a bridge base connecting piece body and first sliding rail parts which are located on the two sides of the bridge base connecting piece body and arranged oppositely, and the opposite outer surfaces of the outer sides of the first sliding rail parts are sunken inwards to form first concave grooves for containing the first guide rails; the first guide rail parts of the suspension fast-disassembly support and the first sliding rail parts of the bridge base connecting piece form the first guide rail mechanisms.

6. The detachable modular electric skateboard according to claim 5, characterized in that the suspension fast-disassembly support is provided with an anti-disengagement buckle used for preventing accidental disengagement of the first guide rail mechanisms, the anti-disengagement buckle is arranged on the suspension fast-disassembly support body between the first guide rail parts, and the anti-disengagement buckle is connected to the bridge base connecting piece body between the first sliding rail parts.

7. A detachable modular electric skateboard, comprising a board body and wheel frames arranged at the bottom of the board body and provided with wheels driven by external force to travel together with the board body and the wheel frames, characterized in that the detachable modular electric skateboard further comprises a traveling suspension part and a power supply control part, wherein the traveling suspension part is detachably installed at the end of the board body, the power supply control part is arranged at the bottom of the board body, and the power supply control part is provided with a detachably-installed battery assembly, wherein the power supply control part at least comprises the battery assembly and a control support assembly, the control support assembly is arranged at the bottom of the board body, and the battery assembly is detachably installed on the control support assembly, wherein the battery assembly is slidably connected with the control support assembly in an inserted mode, matched second guide rail mechanisms are formed by the battery assembly and the control support assembly, and the battery assembly and the control support assembly are slidably connected into a whole through the second guide rail mechanisms.

8. The detachable modular electric skateboard according to claim 7, characterized in that the control support assembly is of a segmental connection structure and at least comprises a battery sliding rail support, an electronic speed regulator box, an electronic speed regulator cover plate, a battery fast-disassembly frame support and a battery fast-disassembly frame, and the battery sliding rail support, the electronic speed regulator box, the electronic speed regulator cover plate, the battery fast-disassembly frame support and the battery fast-disassembly frame are assembled into a whole; the matched second guide rail mechanisms are formed by the battery sliding rail support and the battery assembly, and the battery sliding rail support and the battery assembly are slidably connected into a whole through the second guide rail mechanisms; the battery fast-disassembly frame can rotate around the battery fast-disassembly frame support.

9. The detachable modular electric skateboard according to claim 8, characterized in that a control support further comprises a power connector, a power connector male head, adapter printed circuit boards (PCBs), an electronic speed regulator and a remote control signal receiver, and the power connector, the power connector male head, the adapter PCBs, the electronic speed regulator and the remote control signal receiver are integrated in the control support through electrical connection; the power connector, the power connector male head, the adapter PCBs, the electronic speed regulator and the remote control signal receiver are arranged in the space defined by the electronic speed regulator box and the electronic speed regulator cover plate, a hole matched with the power connector male head is formed in the battery sliding rail support, the remote control signal receiver is used for receiving a signal and transmitting the signal to the electronic speed regulator, and the electronic speed regulator controls the current output to the traveling suspension part according to the intensity of the signal.

10. The detachable modular electric skateboard according to claim 8, characterized in that the battery sliding rail support at least comprises a battery sliding rail support body and second guide rail parts which are located on the two sides of the battery sliding rail support body and arranged oppositely;

the second guide rail parts are sheet assemblies with bending angles, a space for containing the battery assembly is formed by the two second guide rail parts, each second guide rail part can be divided into a first sheet body and a second sheet body located under the first sheet body, and the inner side face of the joint part of each first sheet body and the corresponding second sheet body protrudes outwards to form a second guide rail;

the second guide rails are matched with second sliding rail parts on a battery box shell constituting the battery assembly, and the battery assembly is installed on the battery sliding rail support through the sliding fit between the second sliding rail parts and the second guide rails.

11. The detachable modular electric skateboard according to claim 10, characterized in that the second guide rail parts of the battery sliding rail support are each provided with at least one index pin hole, and the index pin holes are matched with index pins installed in the index pin holes, so that the battery assembly is prevented from disengaging from the battery sliding rail support.

12. The detachable modular electric skateboard according to claim 8, characterized in that the battery fast-disassembly frame at least comprises a rotary combination part located at the end of the battery fast-disassembly frame, the rotary combination part is provided with an unthreaded shaft, the two ends of the unthreaded shaft can be inserted into rotating holes formed in the battery fast-disassembly frame support and can rotate, and the rotating holes are oppositely formed in the inner side of the battery fast-disassembly frame support.

13. The detachable modular electric skateboard according to claim 12, characterized in that the unthreaded shaft is at least sleeved with one triangular shaft with a triangular cross section, three parallel and independent triangular shaft holes are formed in the triangular shaft in the axial direction of the triangular shaft, and the unthreaded shaft can be inserted in any triangular shaft hole of the triangular shaft.

14. A detachable modular electric skateboard, comprising a board body and wheel frames arranged at the bottom of the board body and provided with wheels driven by external force to travel together with the board body and the wheel frames, characterized in that the detachable modular electric skateboard further comprises a traveling suspension part and a power supply control part, wherein the traveling suspension part is detachably installed at the end of the board body, the power supply control part is arranged at the bottom of the board body, and the power supply control part is provided with a detachably-installed battery assembly, wherein the detachable modular electric skateboard further comprises a remote control device, and the remote control device is used for controlling the traveling state of the detachable modular electric skateboard, wherein the remote control device at least comprises an upper remote control cover, a display screen, a display screen driving PCB, a remote control PCB, a remote control battery, a roller potentiometer and a lower remote control cover; the display screen and the display screen driving PCB are connected through a flexible flat cable, and the display screen driving PCB and the remote control PCB are connected in a wired mode.

15. The detachable modular electric skateboard according to claim 14, characterized in that the upper remote control cover, the display screen, the display screen driving PCB, the remote control PCB, the remote control battery, the roller potentiometer and the lower remote control cover are fastened into one complete unit through screws; the control mode of the roller potentiometer is vector control.

* * * * *